United States Patent
Ruder et al.

(10) Patent No.: US 9,108,637 B2
(45) Date of Patent: Aug. 18, 2015

(54) METHOD FOR CONTROLLING A SEPARATING CLUTCH IN A HYBRID DRIVE TRAIN, AND DRIVE TRAIN

(71) Applicant: Schaeffler Technologies AG & Co. KG, Herzogenaurach (DE)

(72) Inventors: Willi Ruder, Lahr (DE); Martin Dilzer, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/151,226

(22) Filed: Jan. 9, 2014

(65) Prior Publication Data

US 2014/0128218 A1    May 8, 2014

Related U.S. Application Data

(63) Continuation of application No. PCT/DE2012/000647, filed on Jun. 26, 2012.

(30) Foreign Application Priority Data

Jul. 11, 2011 (DE) .......................... 10 2011 107 069

(51) Int. Cl.
*B60W 20/00* (2006.01)
*B60K 6/383* (2007.10)
*B60K 6/387* (2007.10)
*B60K 6/48* (2007.10)
*B60W 10/02* (2006.01)
*B60W 10/06* (2006.01)
*B60W 10/08* (2006.01)

(52) U.S. Cl.
CPC ................ *B60W 20/40* (2013.01); *B60K 6/383* (2013.01); *B60K 6/387* (2013.01); *B60K 6/48* (2013.01); *B60W 10/02* (2013.01); *B60W 10/06* (2013.01); *B60W 10/08* (2013.01); *B60K 2006/4825* (2013.01); *B60W 2710/022* (2013.01); *B60W 2710/027* (2013.01); *B60W 2710/0666* (2013.01); *Y02T 10/6252* (2013.01); *Y02T 10/6286* (2013.01); *Y10S 903/902* (2013.01); *Y10T 477/26* (2015.01)

(58) Field of Classification Search
None
See application file for complete search history.

(56) References Cited

U.S. PATENT DOCUMENTS

| 895,624 | A | * | 8/1908 | Garland | ................... 192/70.251 |
| 6,000,515 | A | * | 12/1999 | Kimmig et al. | .......... 192/70.252 |
| 6,050,379 | A | * | 4/2000 | Lyon | ............................ 192/54.1 |

(Continued)

FOREIGN PATENT DOCUMENTS

| DE | 3840484 A1 | 6/1990 |
| JP | 2008126703 A | 6/2008 |

*Primary Examiner* — Justin Holmes
*Assistant Examiner* — David Morris
(74) *Attorney, Agent, or Firm* — Simpson & Simpson, PLLC

(57) ABSTRACT

A hybrid drivetrain and method for controlling a friction clutch of a hybrid drivetrain of a motor vehicle having a combustion engine which is coupled by means of a freewheel to a transmission input shaft of a transmission to transmit the engine torque, and having an electric machine which starts the combustion engine and/or propels the motor vehicle, which friction clutch transmits to the combustion engine a summed torque formed of a starting torque for starting the combustion engine by means of the electric machine and a drag torque which acts on the combustion engine when the drivetrain is in drag mode. To be able to operate the friction clutch reliably and to avoid over-dimensioning of the friction clutch as a result of high summed torques, a torque present at the friction clutch is limited to a predefined transmission torque which can be transmitted via the friction clutch.

4 Claims, 2 Drawing Sheets

(56) References Cited

U.S. PATENT DOCUMENTS

| | | | |
|---|---|---|---|
| 6,991,585 B2 * | 1/2006 | Colvin et al. | 477/174 |
| 7,367,415 B2 * | 5/2008 | Oliver et al. | 180/65.275 |
| 2009/0000901 A1 * | 1/2009 | Reibold | 192/70.252 |
| 2009/0166109 A1 * | 7/2009 | Duan et al. | 180/65.28 |
| 2010/0314185 A1 | 12/2010 | Schoenek | |

* cited by examiner

METHOD FOR CONTROLLING A SEPARATING CLUTCH IN A HYBRID DRIVE TRAIN, AND DRIVE TRAIN

CROSS-REFERENCE TO RELATED APPLICATIONS

This patent is filed under 35 U.S.C. §120 and §365(c) as a continuation of International Patent Application No. PCT/DE2012/000647 filed Jun. 26, 2012, which application claims priority from German Patent Application No. 10 2011 107 069.2 filed Jul. 11, 2011, which applications are incorporated herein by reference in their entireties.

FIELD OF THE INVENTION

The invention relates to a hybrid drivetrain and to a method for controlling a friction clutch of a hybrid drivetrain of a motor vehicle having a combustion engine which is coupled by means of a freewheel to a transmission input shaft of a transmission in order to transmit the engine torque, and having an electric machine which starts the combustion engine and/or propels the motor vehicle, which friction clutch transmits to the combustion engine a transmission torque formed of a starting torque for starting the combustion engine by means of the electric machine and a drag torque which acts on the combustion engine when the drivetrain is in drag mode.

BACKGROUND OF THE INVENTION

Hybrid drivetrains are well known from series applications. In such cases, in addition to a combustion engine which drives a transmission input shaft, an electric machine is provided which serves as a generator in the deceleration phase of the drivetrain, and furthermore, in an electric-motor operating mode drives the combustion engine and/or the motor vehicle using the hybrid drivetrain alone or as support in combination with the combustion engine. In these cases, a friction clutch operates between the combustion engine and the electric machine, which uncouples these from each other.

In a special hybrid drivetrain, a freewheel is positioned between the crankshaft of the combustion engine and the transmission input shaft of the transmission, which is situated such that it blocks in the direction of transmission of torque from the combustion engine to the transmission, and rolls over in the drag direction. To be able to transmit drag torque to the combustion engine, for example, to decelerate the motor vehicle in addition to possible recovery of the electric machine, the friction clutch is at least partially engaged for this purpose. Furthermore, the friction clutch is engaged if the combustion engine is to be started in a cold or warm start by means of the electric machine, for example, when the motor vehicle is standing still, or while the motor vehicle is being propelled exclusively by means of the electric machine or is coasting. To this end, a starting torque, which is formed exclusively by the electric machine and/or from the kinetic energy of the motor vehicle, is transmitted via the friction clutch. The summed torque is therefore made up proportionately of drag torque and starting torque, and may far exceed the requisite torque necessary for starting the combustion engine or for supporting drag torque when the friction clutch is conventionally engaged, so that the components of the friction clutch, such as, for example, leaf springs, riveted joints, the clutch plate and the like, which are positioned between the pressure plate and the housing must be appropriately largely dimensioned. For example, when lining friction coefficients of the friction linings of the clutch plate change, especially high torques, which are unnecessary at this level can be transmitted.

BRIEF SUMMARY OF THE INVENTION

The object of the invention is to provide an improved method for controlling a friction clutch in a hybrid drivetrain, and a hybrid drivetrain having a smaller-dimensioned friction clutch.

The invention is a method for controlling a friction clutch of a hybrid drivetrain of a motor vehicle having a combustion engine which is coupled by means of a freewheel to a transmission input shaft of a transmission to transmit the engine torque, and having an electric machine which starts the combustion engine and/or propels the motor vehicle, which friction clutch transmits to the combustion engine a summed torque formed by a starting torque for starting the combustion engine by means of the electric machine and a drag torque which acts on the combustion engine when the drivetrain is in drag mode; the summed torque present at the friction clutch being limited to a predefined transmission torque which can be transmitted via the friction clutch. By limiting the transmissible torque, the friction clutch can be designed for the transmission torque actually needed, and thus, for a smaller transmission capacity, which can save costs. In this case, the friction clutch is engaged only far enough, by specifying an actuator distance of the clutch travel, depending on coefficients of friction of the friction linings of the clutch plate and clamping forces of a clutch actuator, for the necessary transmission torque to be transmitted. Higher torque proportions are blocked out by the slipping operation of the friction clutch. In an embodiment, the friction clutch does not engage completely until the coefficients of friction assume a minimum calculated value, and the calculated tolerance values are at the limiting values.

In order to avoid energy losses while the friction clutch is being held, the clutch actuator is designed to be self-arresting, for example, as a spindle actuator having a self-arresting thread pitch of the spindle.

The friction clutch is controlled by means of a control device, which issues an actuator travel for the clutch actuator from a predefined transmission torque by means of a characteristic curve. The characteristic curve is set up from the coefficient of friction and the actuator travel, and is adapted as needed, for example, regularly and/or after a number of clutch procedures. An adaptation of the characteristic curve can be made, for example, by determining the Y axis section in the form of a contact point at which the friction clutch just begins to transmit torque, and a slope in the form of an actuator travel ascertained at a predefined torque.

In addition, the invention is a drivetrain for carrying out the proposed method, having a combustion engine which is coupled by means of a freewheel to a transmission input shaft of a transmission to transmit the engine torque, and having an electric machine which starts the combustion engine and/or propels the motor vehicle, a friction clutch at which a summed torque formed of a starting torque for starting the combustion engine by means of the electric machine and a drag torque which acts on the combustion engine when the drivetrain is in drag mode is present, the friction clutch being designed for a predefined transmission torque, which limits the summed torque while maintaining a safety margin. Because of the limited transmission torque, the friction clutch can be designed for smaller torques to be transmitted. It goes without saying that appropriate safety margins which allow for tolerances of the individual clutch components are provided here.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
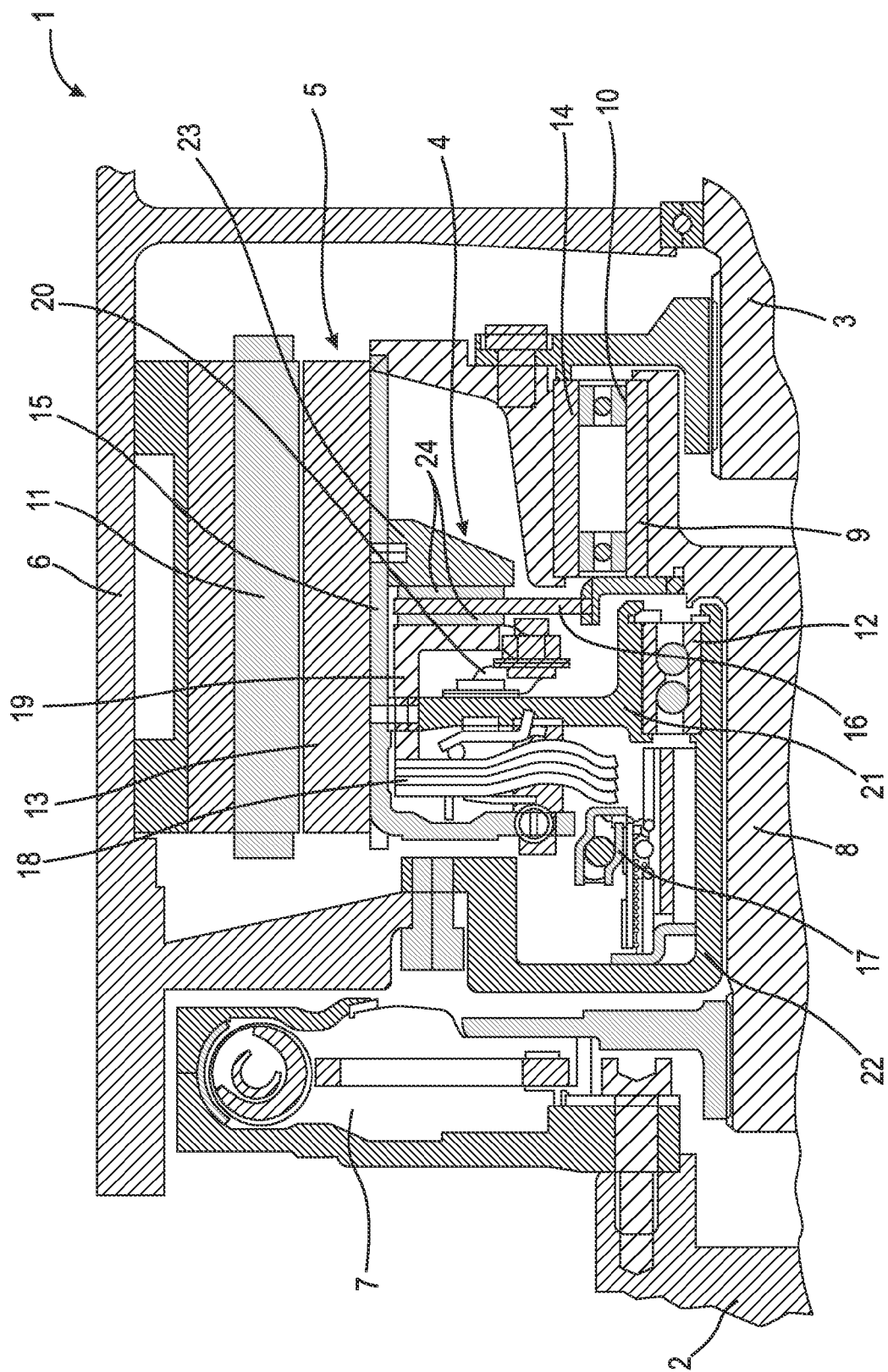
FIG. 1 is a partial section of a hybrid drivetrain of the present invention.

FIG. 1 shows a partial section of hybrid drivetrain 1 of a motor vehicle having a combustion engine, of which only crankshaft 2 is depicted, transmission input shaft 3 of the transmission, not shown in greater detail, friction clutch 4 and electric machine 5. Crankshaft 2 is linked to intermediate shaft 8 via torsional vibration damper 7, and conveys the torque of the combustion engine into transmission input shaft 3 through input part 9 of freewheel 10. The electric machine accommodated on housing 6 by means of stator 11 is connected non-rotatingly to the output part of freewheel 10 by means of rotor 13. In addition, rotor 13 is non-rotatingly connected to input part 15 of friction clutch 4. The output part of friction clutch 4 is formed by clutch plate 16, which is non-rotatingly connected to intermediate shaft 8.

Clutch actuator 17 displaces pressure plate 19 axially by means of cup spring 18, and braces pressure plate 19, which is supported by means of leaf springs 20 non-rotatingly and axially movably on supporting part 21, which is received rotatably relative to housing component 22 by means of bearing 12, against axially fixed opposing pressure plate 23, so that friction linings 24 of clutch plate 16 are tensioned, and by forming a frictional engagement with pressure plate 19 and opposing pressure plate 23, the transmission torque is transmitted from rotor 13 or transmission input shaft 3, while bypassing freewheel 10, which is rolled over in this direction of torque, to the intermediate shaft, and from there via torsional vibration damper 7 to crankshaft 2.

Figure 2:
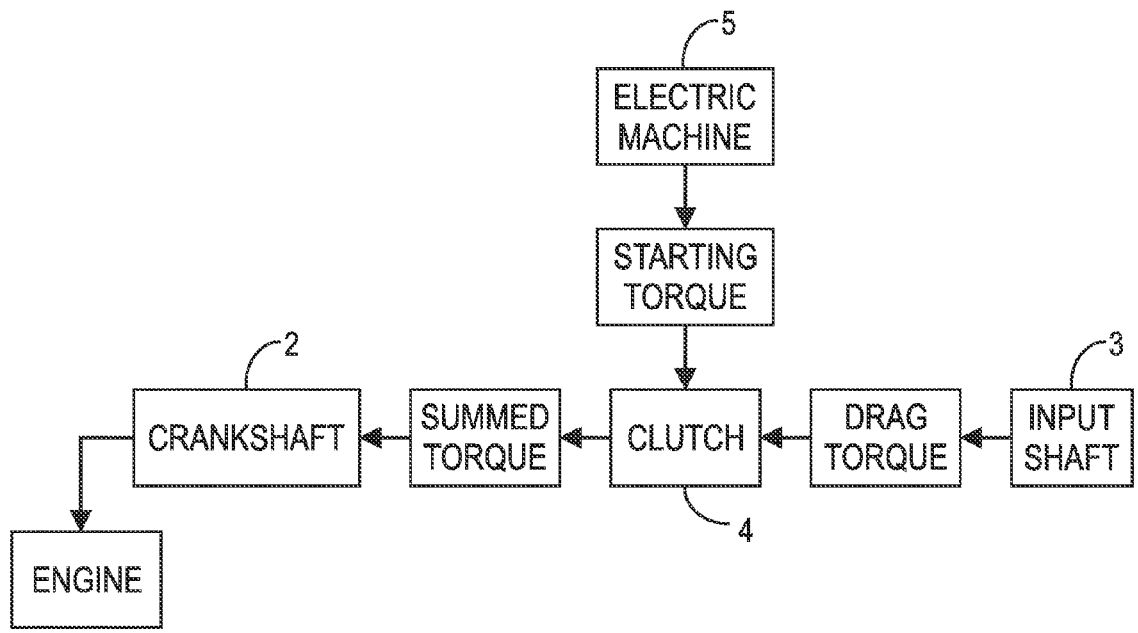
FIG. 2 is a block diagram illustrating a summed torque.

The combustion engine is started when the motor vehicle is standing still, through friction clutch 4, by applying the starting torque by means of electric machine 5, with the friction clutch being engaged just far enough so that the starting torque of the combustion engine is transmitted. In addition, the combustion engine can be started when the motor vehicle is moving, in that the kinetic energy which is present when a gear ratio of the transmission is engaged, which is supplied, for example, by coasting or propulsion solely by electric machine 5, is conducted to crankshaft 2 via friction clutch 4. Finally, when friction clutch 4 is transmitting torque, drag torque can be transmitted from transmission input shaft 3 to rotor 13, which serves to produce electrical energy or provide drag braking of the motor vehicle by means of the combustion engine. Thus, as shown in FIG. 2: starting torque from electric machine 5 is transmitted to clutch 4; drag torque from input shaft 3 is transmitted to clutch 4; and clutch 4 transmits a summed torque, formed of a starting torque for starting the combustion engine by means of electric machine 5 and a drag torque which acts on the combustion engine when the drivetrain is in drag mode, to the engine via crankshaft 2. In both cases, friction clutch 4 is engaged just far enough, or is operated with slip, so that only the predefined transmission torque is transmitted. The transmission torque is designed so that both the starting torque and a desired drag torque are reliably transmitted; in addition, the friction clutch serves as overload protection to protect itself, so that overloading of the friction clutch is prevented by adjusting slip when greater drag torque is present. By specifying the transmission torque, the friction clutch can be adjusted for the maximum requisite torques and designed accordingly. In this way, it is not necessary to design for peak torques, which enables the friction clutch to be dimensioned smaller despite being designed for a long, reliable service life.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMBERS 1 drivetrain
2 crankshaft
3 transmission input shaft
4 friction clutch
5 electric machine
6 housing
7 torsional vibration damper
8 intermediate shaft
9 input part
10 freewheel
11 stator
12 bearing
13 rotor
14 output part
15 input part
16 clutch plate
17 clutch actuator
18 cup spring
19 pressure plate
20 leaf spring
21 supporting part
22 housing component
23 opposing pressure plate
24 friction lining

What is claimed is:

1. A method for controlling a friction clutch of a hybrid drivetrain of a motor vehicle having a combustion engine, which is coupled by means of a freewheel to a transmission input shaft of a transmission to transmit engine torque, the method comprising the following steps:
transmitting drag torque from the input shaft to the friction clutch;
transmitting starting torque from an electric machine to the friction clutch;
transmitting, via the friction clutch, a summed torque, formed of the starting torque and the drag torque, to the combustion engine for starting the combustion engine by means of the electric machine; and, slipping the friction clutch to limit the summed torque present at the friction clutch to a predefined transmission torque which can be transmitted via the friction clutch.

2. The method as recited in claim 1, wherein the friction clutch is operated by means of a self-arresting clutch actuator.

3. A drivetrain, comprising:
a combustion engine which is coupled by means of a freewheel to a transmission input shaft of a transmission to transmit engine torque;
an electric machine which transmits a starting torque and/or propels the motor vehicle; and,
a friction clutch arranged to receive a summed torque, formed of the starting torque and a drag torque from the input shaft, for starting the combustion engine by means of the electric machine, wherein the friction clutch is designed for a predefined transmission torque which limits the summed torque.

4. A drivetrain, comprising:
a combustion engine which is coupled by means of a freewheel to a transmission input shaft of a transmission to transmit engine torque;
an electric machine which transmits a starting torque and/or propels the motor vehicle; and,
a friction clutch arranged to:
  receive a summed torque, formed of the starting torque and a drag torque transmitted by the input shaft, for starting the combustion engine by means of the electric machine; and,
  slip to limit the summed torque to a predefined transmission torque.

* * * * *